United States Patent
Yu et al.

(10) Patent No.: US 10,432,764 B2
(45) Date of Patent: Oct. 1, 2019

(54) MOBILE TERMINAL

(71) Applicant: GUANGDONG OPPO MOBILE TELECOMMUNICATIONS CORP., LTD., Dongguan, Guangdong (CN)

(72) Inventors: Weibin Yu, Guangdong (CN); Jiao Cheng, Guangdong (CN); Yugui Lin, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/780,671

(22) PCT Filed: Dec. 29, 2016

(86) PCT No.: PCT/CN2016/113034
§ 371 (c)(1),
(2) Date: Jun. 1, 2018

(87) PCT Pub. No.: WO2017/114463
PCT Pub. Date: Jul. 6, 2017

(65) Prior Publication Data
US 2018/0359344 A1 Dec. 13, 2018

(30) Foreign Application Priority Data
Dec. 29, 2015 (CN) .......................... 2015 1 1026170

(51) Int. Cl.
*H04M 1/02* (2006.01)

(52) U.S. Cl.
CPC ....... *H04M 1/0268* (2013.01); *H04M 1/0214* (2013.01); *H04M 1/0216* (2013.01); *H04M 1/0264* (2013.01)

(58) Field of Classification Search
CPC ............. H04M 1/0268; H04M 1/0214; H04M 1/0216; H04M 1/0264
(Continued)

(56) References Cited

U.S. PATENT DOCUMENTS 7,149,557 B2 * 12/2006 Chadha ............... H04M 1/0202
455/575.1
8,116,834 B2 * 2/2012 Jang ..................... H04M 1/0237
455/566
(Continued)

FOREIGN PATENT DOCUMENTS

CN 203632709 6/2014
CN 104378467 2/2015
(Continued)

OTHER PUBLICATIONS

SIPO, First Office Action for CN Application No. 201511026170, dated Nov. 17, 2017.
(Continued)

*Primary Examiner* — Julio R Perez
(74) *Attorney, Agent, or Firm* — Hodgson Russ LLP

(57) ABSTRACT

The present disclosure provides a mobile terminal. The mobile terminal includes a main body and a flexible screen assembly. The main body defines a receiving cavity and includes a front side and a back side arranged opposite to each other, the receiving cavity has an opening located between the front side and the back side. The flexible screen assembly includes a fixed portion and an activity portion connected sequentially, the fixed portion is provided on the front side, and the activity portion is bent over and received in the receiving cavity or is bent over and contacts the back side.

15 Claims, 2 Drawing Sheets

(58) Field of Classification Search
USPC ............................ 455/575.1, 575.4; 345/619
See application file for complete search history.

(56) References Cited

U.S. PATENT DOCUMENTS

| | | | |
|---|---|---|---|
| 8,294,843 B2* | 10/2012 | Hollaway | G02F 1/133308 345/173 |
| 9,258,396 B2* | 2/2016 | Hwang | G06F 1/1677 |
| 2009/0051830 A1* | 2/2009 | Matsushita | G02F 1/133305 348/836 |
| 2012/0307423 A1 | 12/2012 | Bohn et al. | |
| 2013/0010405 A1 | 1/2013 | Rothkopf et al. | |
| 2013/0201208 A1* | 8/2013 | Cho | G06F 3/1431 345/619 |
| 2015/0230349 A1 | 8/2015 | Lee et al. | |

FOREIGN PATENT DOCUMENTS

| | | |
|---|---|---|
| CN | 104900149 | 9/2015 |
| CN | 104967713 | 10/2015 |
| JP | 2001186226 | 7/2001 |
| KR | 20100058416 | 6/2010 |

OTHER PUBLICATIONS

EPO, Office Action for EP Application No. 16881252, dated Dec. 3, 2018.
KIPO, Office Action for KR App. No. 10-2018-7017165, dated Jul. 26, 2019.

* cited by examiner

MOBILE TERMINAL

CROSS-REFERENCE TO RELATED APPLICATIONS

This application is a U.S. national phase application of International Application No. PCT/CN2016/113034, filed Dec. 29, 2016, which claims priority of Chinese Patent Application Ser. No. 201511026170.8, titled "Mobile terminal" and filed with the State Intellectual Property Office of P. R. China on Dec. 29, 2015, the entire content of which is incorporated herein by reference.

FIELD

The present disclosure relates to a technical field of electronic equipment, and more particularly to a mobile terminal.

BACKGROUND

A large display screen of a mobile terminal has become a trend. In the related art, manufacturers realize the large display screen by continuously enlarging the size of the mobile terminal. As the size of the mobile terminal becomes larger and larger, it is inconvenient for a user to take along, which reduces portability of the mobile terminal.

SUMMARY

The present disclosure provides a mobile terminal, including: a main body, defining a receiving cavity, and the main body including a front side and a back side, the front side and the back side being arranged opposite to each other, the receiving cavity having an opening located between the front side and the back side; and a flexible screen assembly, including a fixed portion and an activity portion connected sequentially, the fixed portion being provided on the front side, and the activity portion being bendable over and received in the receiving cavity or being bendable over and contacting the back side.

The present disclosure also provides another mobile terminal, including: a main body, including a front side and a back side arranged opposite to each other as well as a side wall connected between the front side and the back side, the main body defining a receiving cavity, and the receiving cavity having an opening located in the side wall; and a flexible screen assembly, including a fixed portion and an activity portion extending from a side of the fixed portion, the fixed portion being provided on the front side of the main body, and the activity portion being bendable around the side wall to contact the back side or extending into the receiving cavity through the opening of the receiving cavity.

The present disclosure further provides still another mobile terminal, the mobile terminal includes: a main body, defining a receiving cavity, and the main body including a front side and a back side, the front side and the back side being arranged opposite to each other, the receiving cavity having an opening located between the front side and the back side; and a flexible screen assembly, electrically coupled with the main body and including a fixed portion arranged on the front side and an activity portion capable of being bent freely, and the activity portion being bendable over and received in the receiving cavity or being bendable over and attached to the back side.

BRIEF DESCRIPTION OF THE DRAWINGS

To describe technical solutions in embodiments of the present disclosure more clearly, the following will briefly introduce the accompanying drawings required for the description of the embodiments. Obviously, the accompanying drawings described below only show some embodiments of the present disclosure, and those skilled in the art can obtain other drawings based on these drawings without paying creative efforts.

DETAILED DESCRIPTION

Figure 1:
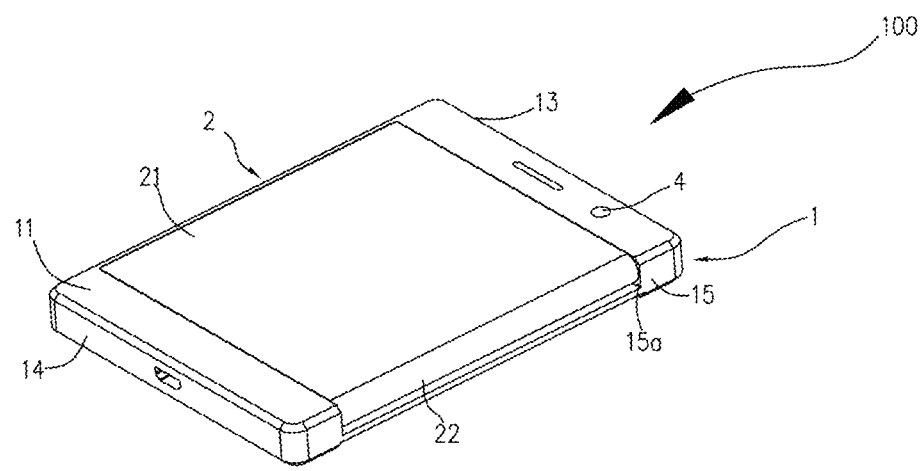
FIG. 1 is a schematic illustration of a mobile terminal according to embodiments of the present disclosure, in which the mobile terminal is in a stored state.
Figure 2:
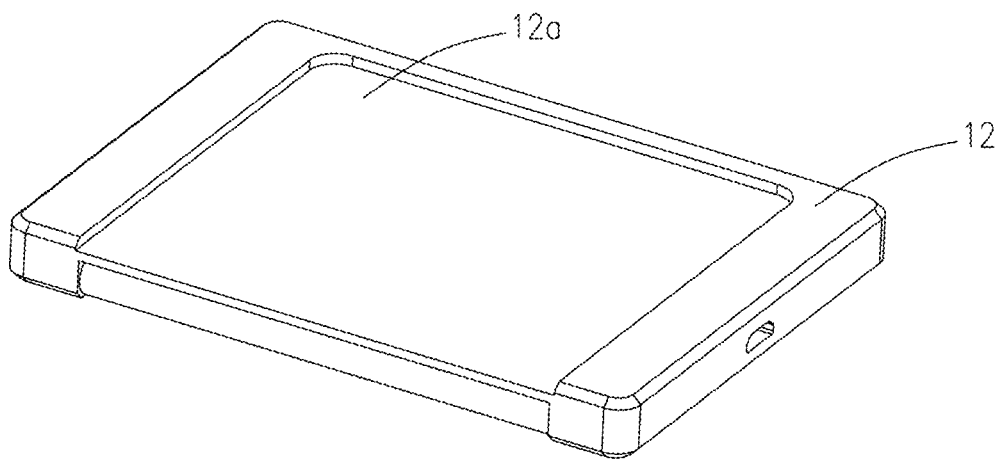
FIG. 2 is a schematic illustration of the mobile terminal in FIG. 1 from another viewing angle, in which the mobile terminal is in the stored state.
Figure 3:
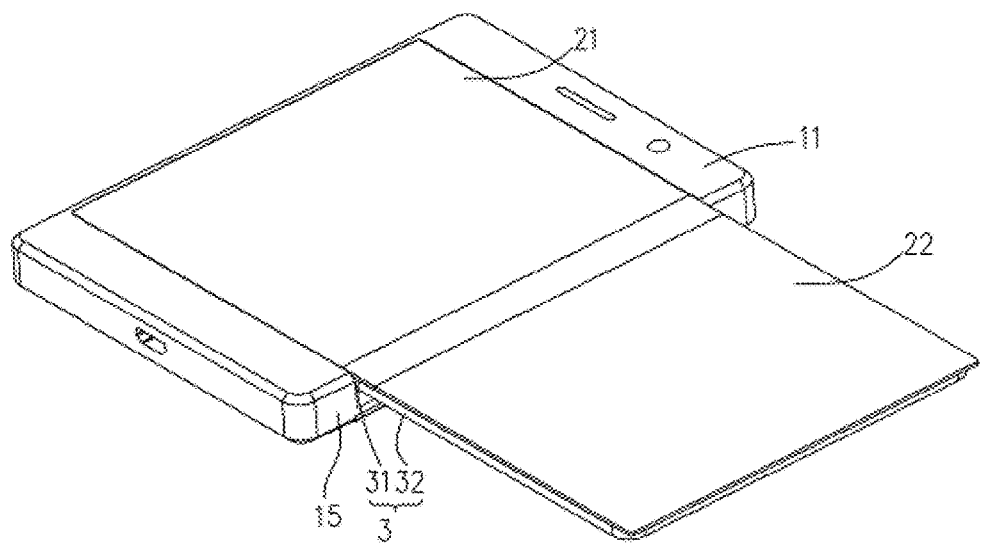
FIG. 3 is a schematic illustration of a mobile terminal according to embodiments of the present disclosure, in which the mobile terminal is in use.
Figure 4:
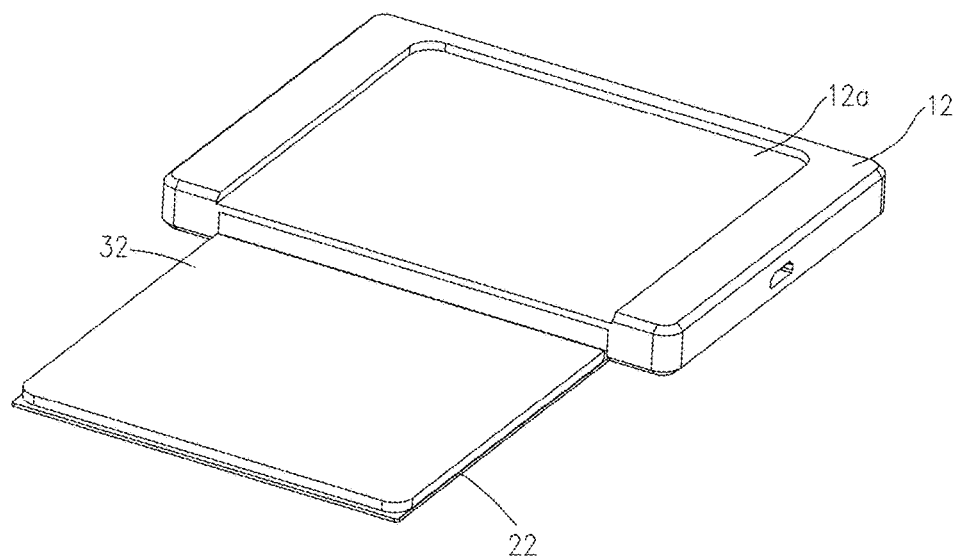
FIG. 4 is a schematic illustration of the mobile terminal in FIG. 3 from another viewing angle, in which the mobile terminal is in use.

Technical solutions in embodiments of the present disclosure will be described clearly and completely in combination with reference to the accompanying drawings in the embodiments of the present disclosure.

A mobile terminal 100 according to embodiments of the present disclosure may be any device that has communication and storage functions, such as a tablet computer, a mobile phone, an e-reader, a remote controller, a personal computer (PC), a notebook computer, a vehicle-mounted device, a network television, a wearable device, and other network-enabled smart devices.

In the description of the embodiments of the present disclosure, it is to be understood that phraseology and terminology used herein with reference to device or element orientation (for example, terms like "upper," "lower," "left," "right," and the like) refer to the orientation or position relationship as shown in the drawings under discussion for simplifying the description of the present disclosure, but do not indicate or imply that the device or element referred to must have a particular orientation, or be constructed and operated in a particular orientation. Therefore, the terms cannot be constructed to limit the present disclosure.

A mobile terminal 100 according to embodiments of the present disclosure includes a main body 1 and a flexible screen assembly 2. The flexible screen assembly 2 has a fixed portion 21 arranged on a front side 11 of the main body 1, and an activity portion 22 capable of being bent freely. A receiving cavity 15a is defined in the main body 1, such that when not in use, the activity portion 22 is bent over and attached to a back side 12 or is bent over and received in the receiving cavity 15a for storage, which reduces the volume of the mobile terminal 100 and improve portability of the mobile terminal 100.

In an embodiment, the main body 1 is a rectangular structural member. The main body 1 is internally provided with a circuit board and electronic components electrically coupled with the circuit board. The main body 1 includes the front side 11 and the back side 12 arranged opposite, an upper end side 13 and a lower end side 14 arranged opposite, and two side walls 15 arranged opposite. The thickness of the main body 1 is defined as a distance between the front side 11 and the back side 12; the length of the main body 1 is defined as a distance between the upper end side 13 and the lower end side 14; and the width of the main body 1 is defined as a distance between the two side walls 15 of the main body 1.

The side wall 15 of the main body 1 defines the receiving cavity 15a, and the receiving cavity 15a is the same size as the activity portion 22, such that the activity portion 22 can be well received in the receiving cavity 15a.

In this embodiment, the flexible screen assembly 2 includes the fixed portion 21 and the activity portion 22 connected in sequence, the fixed portion 21 is arranged on the front side 11, the flexible screen assembly 2 is electrically coupled with the main body 1, and an end of the activity portion 22 extends away from the side wall 15 and contacts the back side 12.

Specifically, the flexible screen assembly 2 is in the shape of a long rectangle. The length of the flexible screen assembly 2 is smaller than the sum of widths of the front side 11 and the back side 12, such that the end of the activity portion 22 will not extend beyond the main body 1 when the activity portion 22 is bent over and attached to the back side 12. In the flexible screen assembly 2, electrical signals are mainly integrated on the fixed portion 21 to facilitate the bending of the activity portion 22. It could be understood that a user may interact with the mobile terminal 100 by touching the flexible screen assembly 2 after the flexible screen assembly 2 is electrically coupled with the main body 1.

The activity portion 22 can be bent over along the side wall 15 and be attached to the back side 12. When the activity portion 22 is bent over and attached to the back side 12, the user can also view contents displayed on the mobile terminal 100 by means of the back side 12. When the mobile terminal 100 is not in use, the activity portion 22 is bent and inserted into the receiving cavity 15a for storage.

When the mobile terminal 100 needs to be used in full screen, the flexible screen assembly 2 is in an unfolded state to form a large screen. When the mobile terminal 100 does not need to be used or only needs to be used in a small screen, the activity portion 22 is received in the receiving cavity 15a, or is bent over and attached to the back side 12, which reduces the volume of the mobile terminal 100 and enhances the portability of the mobile terminal 100.

In an embodiment, the mobile terminal 100 also includes a support plate 3. The support plate 3 includes a rotating portion 31 and a support portion 32 connected in sequence, the rotating portion 31 is rotatably connected to the side wall 15, and the support portion 32 contacts the back side 12.

By additionally providing the support plate 3, the flexible screen assembly 2 is allowed to be supported on the support portion 32 of the support plate 3 when the flexible screen assembly 2 is used in a large screen, i.e. the flexible screen assembly 2 is fully unfolded. In such a way, presses exerted on the activity portion 22 are supported, thereby improving press sensitivity of the mobile terminal 100.

In this embodiment, the side wall 15 is provided with a strip-shaped gap, such that the support portion 32 cannot protrude beyond the side wall 15 when the rotating portion 31 is rotatably connected to the side wall 15, thereby further improving flatness of the mobile terminal 100. The strip-shaped gap is arranged adjacent to an opening of the receiving cavity 15a, and the strip-shaped gap and the opening of the receiving cavity 15a are close to the front side 11 and the back side 12 correspondingly. Two gap walls facing each other are provided at the strip-shaped gap in order along the length of the main body 1, and each of the two gap walls defines a rotating hole.

The rotating portion 31 is columnar and is provided with two protruding rotating shafts at two sides of the rotating portion 31 opposite to each other in an axial direction, and the rotatable connection between the rotating portion 31 and the side wall 15 is realized in such a way that the two rotating shafts are rotatably connected in the two rotating holes correspondingly. That is, the support plate 3's axis of rotation is parallel to a length direction of the main body 1, such that the support portion 32 can be opened and closed relative to the back side 12 at an angle ranging from 0 to 180 degrees.

When the support plate 3 is in use, the support portion 32 is rotated by 180 degrees relative to the back side 12, such that the activity portion 22 of the flexible screen assembly 2 can be attached to the support portion 32, presses on the activity portion 22 are supported, and the press sensitivity of the mobile terminal 100 is improved.

When the support plate 3 is not in use, the support portion 32 is rotated to make the support plate 3 attached to the back side 12, so as to reduce the volume of the mobile terminal 100 and enhance the portability of the mobile terminal 100.

Optionally, the back side 12 defines a recess 12a, and the support portion 32 is received in the recess 12a.

By defining the recess 12a in the back side 12, when the support portion 32 is attached to the back side 12, the support portion 32 can be received in the recess 12a, thereby improving the flatness of the mobile terminal 100.

In this embodiment, the back side 12 defines the recess 12a in a position where the support portion 32 is attached to the back side 12. The thickness of the recess 12a along a direction from the front side 11 to the back side 12 is slightly smaller than or equal to the thickness of the support portion 32, such that the back side 12 is a flat plane after the support portion 32 is rotated and attached to the back side 12, thereby improving the flatness of the mobile terminal 100.

In an embodiment, the mobile terminal 100 also includes a connecting assembly. The connecting assembly includes a first connecting member and a second connecting member, the first connecting member is provided in the recess 12a, and the second connecting member is arranged in the support portion 32. When the support portion 32 is attached to the recess 12a, the second connecting member is connected with the first connecting member.

By additionally providing the connecting assembly, the connection between the support plate 3 and the main body 1 can be more stable when the support plate 3 is received on the main body 1, so as to enhance reliability of the mobile terminal 100.

In this embodiment, optionally, the second connecting member is magnetically attracted to the first connecting member. Specifically, the first connecting member is made of iron, and is arranged on the recess 12a and away from the side wall 15. The second connecting member is made of a magnet, and is arranged in the support portion 32 and close to an end of the support portion 32. When the support portion 32 approaches the recess 12a, an attraction force is generated between the connecting members, such that the second connecting member is magnetically attracted to the first connecting member. Therefore, the support plate 3 can be connected with the main body 1 more stably when received on the main body 1, thereby improving the reliability of the mobile terminal 100. When the support plate 3 needs to be used, it is only necessary to overcome the magnetic attraction force between the connecting members and rotate the support portion 32. Certainly, in other embodiments, the second connecting member can be snap-connected to the first connecting member.

In an embodiment, a camera module 4 is provided on the main body 1 and located at the same side as the flexible screen assembly 2.

By providing the camera module 4 on the main body 1, the mobile terminal 100 can satisfy self-photographing and scene-photographing requirements by means of one camera module 4.

Specifically, the camera module 4 is provided on the main body 1. It could be understood that the camera module 4 may be arranged on the front side 11 to which the fixed portion 21 of the flexible screen assembly 2 is fixed, such that the camera module 4 is located at the same side as the fixed portion 21. It could be understood that the camera module 4 may also be arranged to the back side 12, and located at the same side as the activity portion 22 when the activity portion 22 is attached to the back side 12.

Optionally, the camera module 4 is provided on the front side 11. The front side 11 defines a camera hole, the camera hole is close to the upper end side 13, and the camera module 4 is arranged in the camera hole. When the mobile terminal 100 is used for self-photographing, the front side 11 faces the user, and a self-photographing operation is performed. When the mobile terminal 100 is used to photograph a scene, the back side 12 faces the user, the activity portion 22 is bent over and attached to the back side 12 or the support portion 32, and the back side 12 is operated to perform a scene-photographing operation. Certainly, in other embodiments, the camera module 4 can be arranged in the back side 12.

In an embodiment, the mobile terminal 100 also includes a protective member, and the protective member is provided on the flexible screen assembly 2 and located between the main body 1 and the flexible screen assembly 2.

In this embodiment, the flexible screen assembly 2 includes an inner side surface and an outer side surface opposite to each other, and an inner side surface of the fixed portion 21 is connected with the front side 11. The outer side surface is configured as a display and touch surface. Optionally, the protective member is made of silica gel. A thin layer of silica gel is applied to the inner side surface to further improve hardness of the flexible screen assembly 2 and prevent the flexible screen assembly 2 from being too soft, thereby enhancing reliability of the flexible screen assembly 2. Certainly, in other embodiments, the protective member can be a thin steel sheet.

When the mobile terminal 100 needs to be used in full screen, the flexible screen assembly 2 is in the unfolded state to form a large screen, the support plate 3 is used, and the support portion 32 is rotated by 180 degrees relative to the back side 12. As a result, the activity portion 22 of the flexible screen assembly 2 can be attached to the support portion 32, presses on the activity portion 22 are supported, and the press sensitivity of the mobile terminal 100 is improved.

When the mobile terminal 100 does not need to be used or only needs to be used in a small screen, the activity portion 22 is received in the receiving cavity 15a, or is bent over and attached to the back side 12, so as to reduce the volume of the mobile terminal 100 and enhance the portability of the mobile terminal 100.

When the mobile terminal 100 is used for self-photographing, the front side 11 faces the user and performs the self-photographing operation.

When the mobile terminal 100 is used for scene-photographing, the back side 12 faces the user, the activity portion 22 is bent over and attached to the back side 12 or the support portion 32, and the back side 12 is operated to perform the scene-photographing operation.

In the mobile terminal 100 according to the present disclosure, the fixed portion 21 of the flexible screen assembly 2 is arranged in the front side 11 of the main body 1, the activity portion 22 of the flexible screen assembly 2 is capable of being bent freely, and the main body 1 defines the receiving cavity 15a to allow the activity portion 22 to be bent over and attached to the back side 12 or bent over and received in the receiving cavity 15a for storage when the activity portion 22 is not in use, which reduces the volume of the mobile terminal 100 and enhance the portability of the mobile terminal 100.

In the mobile terminal 100 according to the present disclosure, the support plate 3 is provided, such that the flexible screen assembly 2 is supported on the support portion 32 of the support plate 3 when the flexible screen assembly 2 is used in a large screen, i.e. the flexible screen assembly 2 is fully unfolded, and therefore presses on the activity portion 22 are supported, and the press sensitivity of the mobile terminal 100 is improved.

For the mobile terminal 100 according to the present disclosure, by defining the recess 12a in the back side 12, the support portion 32 can be received in the recess 12a when attached to the back side 12, thereby further improving the flatness of the mobile terminal 100.

For the mobile terminal 100 according to the present disclosure, by additionally providing the connecting assembly, the support plate 3 can be connected with the main body 1 more stably when stored on the main body 1, thereby enhancing the reliability of the mobile terminal 100.

For 100 according to the present disclosure, by providing the camera module 4 on the main body 1, the mobile terminal 100 can satisfy self-photographing and scene-photographing requirements by means of one camera module 4.

The above are preferred embodiments of the present disclosure, and it should be noted that those skilled in the art can make various improvements and modifications without departing from the principle of the present disclosure, and these improvements and modifications are also regarded as the protection scope of the present disclosure.

What is claimed is:
1. A mobile terminal, comprising:
    a main body, defining a receiving cavity, the main body comprising a front side and a back side, the front side and the back side being arranged opposite to each other, the receiving cavity having an opening located between the front side and the back side, and the main body comprising a first connecting portion located between the front side and the receiving cavity; and
    a flexible screen assembly, comprising a fixed portion and an activity portion connected sequentially, the fixed portion and the activity portion being a touch display, the fixed portion being fixedly provided on the front side, the activity portion being configured to move between a first position wherein the activity portion is bent about the first connecting portion and received in the receiving cavity, and a second position wherein the activity portion is bent about the receiving cavity to contact the back side, wherein at the second position, the activity portion is opposite to the fixed portion; and
    a support plate comprising a rotating portion and a support portion connected sequentially, the rotating portion being rotatably connected to a side wall of the main body, and the support portion being rotatable to contact the back side, the back side defining a recess, and the support portion being received in the recess when the support portion contacts the back side.

2. The mobile terminal according to claim 1, wherein the side wall is connected between the front side and the back side, and the opening of the receiving cavity is located in the side wall.

3. The mobile terminal according to claim 2, further comprising a connecting assembly that comprises a first connecting member and a second connecting member, the first connecting member being arranged in the recess, the second connecting member being arranged in the support portion, and the second connecting member being connected to the first connecting member when the support portion is received in the recess.

4. The mobile terminal according to claim 3, wherein the second connecting member is snap-connected or magnetically connected to the first connecting member.

5. The mobile terminal according to claim 1, further comprising a camera module, the camera module being arranged in the main body and located at the same side as the flexible screen assembly.

6. The mobile terminal according to claim 5, wherein the camera module is arranged in the front side or the back side.

7. The mobile terminal according to claim 1, further comprising a protective member, the protective member being arranged on the flexible screen assembly and located between the main body and the flexible screen assembly.

8. The mobile terminal according to claim 7, wherein the protective member is made of silica gel.

9. A mobile terminal, comprising:
a main body, comprising a front side and a back side arranged opposite to each other as well as a side wall connected between the front side and the back side, the main body defining a receiving cavity, and the receiving cavity having an opening located in the side wall, and the main body comprising a first connecting portion located between the front side and the receiving cavity; and
a flexible screen assembly, comprising a fixed portion and an activity portion extending from a side of the fixed portion, the fixed portion and the activity portion being a touch display, the fixed portion being fixedly provided on the front side of the main body, the activity portion being configured to move between a first position wherein the activity portion is bent about the side wall to be spread on an outer surface of the back side, and a second position wherein the activity portion extends about the first connecting portion and into the receiving cavity through the opening of the receiving cavity, wherein at the first position, the activity portion is opposite to the fixed portion; and
a support plate comprising a rotating portion and a support portion connected sequentially, the rotating portion being rotatably connected to the side wall, and the support portion being rotatable to contact the back side, the back side defining a recess, and the support portion being received in the recess when the support portion contacts the back side.

10. The mobile terminal according to claim 9, wherein the main body comprises an upper end side and a lower end side arranged opposite to each other and connected between the front side and the back side;
the side wall defines a strip-shaped gap, two gap walls arranged opposite to each other along a direction from the upper end side to the lower end side being provided at the strip-shaped gap, and the rotating portion is rotatably connected with the two gap walls.

11. The mobile terminal according to claim 10, wherein each of the two gap walls defines a rotating hole, the rotating portion is columnar and provided with two protruding rotating shafts at opposite two sides in an axial direction, and the two rotating shafts are rotatably connected in the two rotating holes correspondingly.

12. The mobile terminal according to claim 9, wherein in a direction from the front side to the back side, thickness of the recess is smaller than or equal to thickness of the support portion.

13. The mobile terminal according to claim 9, further comprising two connecting members, one of the two connecting member being arranged in the recess while the other one being arranged in the support portion, and the two connecting members being interconnected to stabilize the support portion to the recess.

14. The mobile terminal according to claim 9, further comprising a protective member, the protective member being provided between the fixed portion and the front side.

15. A mobile terminal, comprising:
a main body, defining a receiving cavity, the main body comprising a front side and a back side, the front side and the back side being arranged opposite to each other, the receiving cavity having an opening located between the front side and the back side, the front side and the back side each having an area larger than that of any side of the main body, and the main body comprising a first connecting portion located between the front side and the receiving cavity; and
a flexible screen assembly, electrically coupled with the main body and comprising a fixed portion fixedly arranged on the front side and an activity portion, the fixed portion and the activity portion being a touch display, and the activity portion being configured to move between a first position wherein the activity portion is bent about the first connecting portion and received in the receiving cavity, and a second position wherein the activity portion is bent about the receiving cavity to be spread on an outer surface of the back side, wherein at the second position, the activity portion is opposite to the fixed portion; and
a support plate comprising a rotating portion and a support portion connected sequentially, the rotating portion being rotatably connected to a side wall of the main body, and the support portion being rotatable to contact the back side, the back side defining a recess, and the support portion being received in the recess when the support portion contacts the back side.

* * * * *